US012711389B2

(12) United States Patent
Yazdanbakhsh et al.

(10) Patent No.: US 12,711,389 B2
(45) Date of Patent: Aug. 18, 2026

(54) DISTRIBUTED CACHE OR REPLAY SERVICE FOR MASSIVELY SCALABLE DISTRIBUTED REINFORCEMENT LEARNING

(71) Applicant: Google LLC, Mountain View, CA (US)

(72) Inventors: Amir Yazdanbakhsh, San Jose, CA (US); Yu Zheng, San Jose, CA (US); Junchao Chen, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 908 days.

(21) Appl. No.: 18/011,630

(22) PCT Filed: Jan. 28, 2021

(86) PCT No.: PCT/US2021/015494
§ 371 (c)(1),
(2) Date: Dec. 20, 2022

(87) PCT Pub. No.: WO2022/039781
PCT Pub. Date: Feb. 24, 2022

(65) Prior Publication Data
US 2023/0229929 A1 Jul. 20, 2023

Related U.S. Application Data

(60) Provisional application No. 63/068,471, filed on Aug. 21, 2020.

(51) Int. Cl.
*G06N 3/092* (2023.01)
*G06N 3/098* (2023.01)

(52) U.S. Cl.
CPC ............ *G06N 3/092* (2023.01); *G06N 3/098* (2023.01)

(58) Field of Classification Search
CPC .............................. G06N 3/092; G06N 3/098
(Continued)

(56) References Cited

U.S. PATENT DOCUMENTS

| | | | | |
|---|---|---|---|---|
| 9,582,421 | B1 * | 2/2017 | Agarwala | G06F 3/0689 |
| 10,445,641 | B2 * | 10/2019 | Srinivasan | G06N 3/045 |

(Continued)

OTHER PUBLICATIONS

Pinto et al., "Hoard: A Distributed Data Caching System to Accelerate Deep Learning Training on the Cloud", 2018, arXiv, 12 pages. (Year: 2018).*

(Continued)

*Primary Examiner* — Ted T. Vo
(74) *Attorney, Agent, or Firm* — DORITY & MANNING P.A.

(57) ABSTRACT

A computing system for performing distributed large scale reinforcement learning with improved efficiency can include a plurality of actor devices, wherein each actor device locally stores a local version of a machine-learned model, wherein each actor device is configured to implement the local version of the machine-learned model at the actor device to determine an action to take in an environment to generate an experience, a server computing system configured to perform one or more learning algorithms to learn an updated version of the machine-learned model based on the experiences generated by the plurality of actor devices, and a hierarchical and distributed data caching system including a plurality of layers of data caches that propagate data descriptive of the updated version of the machine-learned model from the server computing system to the plurality of actor devices to enable each actor device to update its respective local version of the model.

23 Claims, 8 Drawing Sheets

(58) Field of Classification Search
USPC .................................. 717/101–103, 168–178
See application file for complete search history.

(56) References Cited

U.S. PATENT DOCUMENTS

| | | | | |
|---|---|---|---|---|
| 10,893,120 | B2 * | 1/2021 | Seelam .................. | G06N 3/063 |
| 11,507,827 | B2 * | 11/2022 | Srinivasan ............. | G06N 3/047 |
| 11,868,318 | B1 * | 1/2024 | Karr ...................... | H04L 9/0894 |
| 2018/0227379 | A1 | 8/2018 | Fablet et al. | |

OTHER PUBLICATIONS

International Preliminary Report on Patentability for Application No. PCT/US2021/015494, mailed Mar. 2, 2023, 13 pages.
Nair et al., “Massively Parallel Method for Deep Reinforcement Learning”, Jul. 15, 2015, arxiv.org, https://arxiv.org/pdf/1507.04296.pdf, 14 pages.
Liang et al., “RLlib: Abstractions for Distributed Reinforcement Learning”, Dec. 26, 2017, arxiv.org, Comell University Library, Cornell University, Ithaca, New York, XP081326256, 10 pages.
Horgan et al., “Distributed Prioritized Experience Replay”, Mar. 2, 2018, arxiv.org, Cornell University Library, Cornell University, Ithaca, New York, XP080866392, 20 pages.
Yazdanbakhsh, “Google AI blog: Massively Large-Scale Distributed Reinforcement Learning with Menger”, Oct. 2, 2020, https://ai.googleblog.com/2020/10/massively-large-scale-distributed.html, XP055805455, pp. 1-6.
International Search Report for Application No. PCT/US2021/015494, mailed on Jun. 7, 2021, 3 pages.

* cited by examiner

DISTRIBUTED CACHE OR REPLAY SERVICE FOR MASSIVELY SCALABLE DISTRIBUTED REINFORCEMENT LEARNING

CROSS-REFERENCE TO RELATED APPLICATIONS

The present application is based upon and claims the right of priority under 35 U.S.C. § 371 to International Application No. PCT/US2021/015494 filed on Jan. 28, 2021, which claims filing benefit of U.S. Provisional Patent Application Ser. No. 63/068,471 having a filing date of Aug. 21, 2020. Applicant claims priority to and the benefit of each of such applications and incorporate all such applications herein by reference in its entirety.

FIELD

The present disclosure relates generally to reinforcement learning. More particularly, the present disclosure relates to distributed cache and/or replay services that provide scalable distributed reinforcement learning.

BACKGROUND

Reinforcement learning is an area of machine learning that learns a model (e.g., a "policy model") by having actors take actions in an environment in order to optimize a reward, a process which can generally be referred to as gaining "experience". Specifically, the actors may choose (e.g., through use of a policy model) an action within or relative to the environment to attempt to maximize the reward. Performance of the actor can be adjusted in reinforcement learning to better choose future actions that provide better rewards. Specifically, the parameters of the model can be adjusted (e.g., by a "learner") to result in actions which increase the reward(s). Thus, a typical reinforcement learning loop can include the actor taking an action to gain experience and the learner updating the model based on the gained experience.

This reinforcement learning process can be distributed among multiple computing devices, resulting in distributed learning systems. For instance, some distributed learning systems can perform batched inference calls to a centralized server. As another example, some distributed learning systems can use a local inference on each actor with frequent model retrieval from a centralized learner. The use of a centralized learner can be beneficial in handling model versioning and improved consistency. However, in this approach, the scalability of actors can present challenges. For instance, servicing a massive number of read requests from actors to a learner for model retrieval can easily throttle the learner and quickly become a major bottleneck (e.g. significantly increase the convergence time) as the number of actors increases. Additionally and/or alternatively, computing performance is often limited by the efficiency of the input pipeline in feeding the training data into compute cores. As the number of compute cores increases the performance of the input pipeline can become even more determinant in the overall training runtime.

Furthermore, many conventional reinforcement learning techniques require many iterations over an immense amount of samples from the environment to learn a target task. As such, designing a reinforcement learning system to solve challenging tasks can require not only an infrastructure to efficiently scale (e.g. increase the number of actors) and collect thousands of samples from an environment, but also to swiftly iterate over these extensive amounts of samples for training (e.g. fast training iteration by the learner).

Thus, challenges can be associated with large scale distributed settings, e.g., where the actors and the learner are on different computing devices. For instance, it can be desirable to provide model updates after training by the learner for the actors. However, models can typically include relatively large amounts of data and/or must be updated quickly and/or frequently. Additionally and/or alternatively, it can be desirable to scale up the actors to collect as many observations as possible from an environment. For instance, some massively large scale distributed systems can include thousands of actors that send a large number of requests to a centralized learner for model retrieval, which can easily throttle the learner, contributing to inefficiency in the overall time-to-convergence.

SUMMARY

Aspects and advantages of embodiments of the present disclosure will be set forth in part in the following description, or can be learned from the description, or can be learned through practice of the embodiments.

One example aspect of the present disclosure is directed to a computing system for performing distributed large scale reinforcement learning with improved efficiency. The computing system can include a plurality of actor devices, wherein each actor device locally stores a local version of a machine-learned model, and wherein each actor device is configured to implement the local version of the machine-learned model at the actor device to determine an action to take in an environment to generate an experience. The computing system can include a server computing system configured to perform one or more learning algorithms to learn an updated version of the machine-learned model based on the experiences generated by the plurality of actor devices. The computing system can include a hierarchical and distributed data caching system including a plurality of layers of data caches that propagate data descriptive of the updated version of the machine-learned model from the server computing system to the plurality of actor devices to enable each actor device to update its respective local version of the machine-learned model.

Another example aspect of the present disclosure is directed to a computing system for performing distributed large scale reinforcement learning with improved efficiency. The computing system can include a plurality of actor devices, wherein each actor device locally stores a local version of a machine-learned model, and wherein each actor device is configured to implement the local version of the machine-learned model at the actor device to determine an action to take in an environment to generate an experience. The computing system can include a server computing system configured to perform one or more learning algorithms to learn an updated version of the machine-learned model based on the experiences generated by the plurality of actor devices. The computing system can include a distributed replay memory including a plurality of replay buffers, each of the plurality of replay buffers configured to store respective experiences generated by the plurality of actor devices and provide the respective experiences to the server computing system for use in learning the updated version of the machine-learned model.

Another example aspect of the present disclosure is directed to a computing system for performing distributed large scale reinforcement learning with improved efficiency.

The computing system can include a server computing system configured to perform one or more learning algorithms to learn an updated version of a machine-learned model based on a plurality of experiences generated by a plurality of actor devices, wherein each actor device locally stores a local version of the machine-learned model, and wherein each actor device is configured to implement the local version of the machine-learned model at the actor device to determine an action to take in an environment to generate one of the plurality of experiences. The computing system can include a hierarchical and distributed data caching system including a plurality of layers of data caches that propagate data descriptive of the updated version of the machine-learned model from the server computing system to the plurality of actor devices to enable each actor device to update its respective local version of the machine-learned model.

Another example aspect of the present disclosure is directed to a computing system for performing distributed large scale reinforcement learning with improved efficiency. The computing system can include a server computing system configured to perform one or more learning algorithms to learn an updated version of a machine-learned model based on a plurality of experiences generated by the plurality of actor devices, wherein each actor device locally stores a local version of the machine-learned model, and wherein each actor device is configured to implement the local version of the machine-learned model at the actor device to determine an action to take in an environment to generate one of the plurality of experiences. The computing system can include a distributed replay memory including a plurality of replay buffers, each of the plurality of replay buffers configured to store respective experiences generated by the plurality of actor devices and provide the respective experiences to the server computing system for use in learning the updated version of the machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
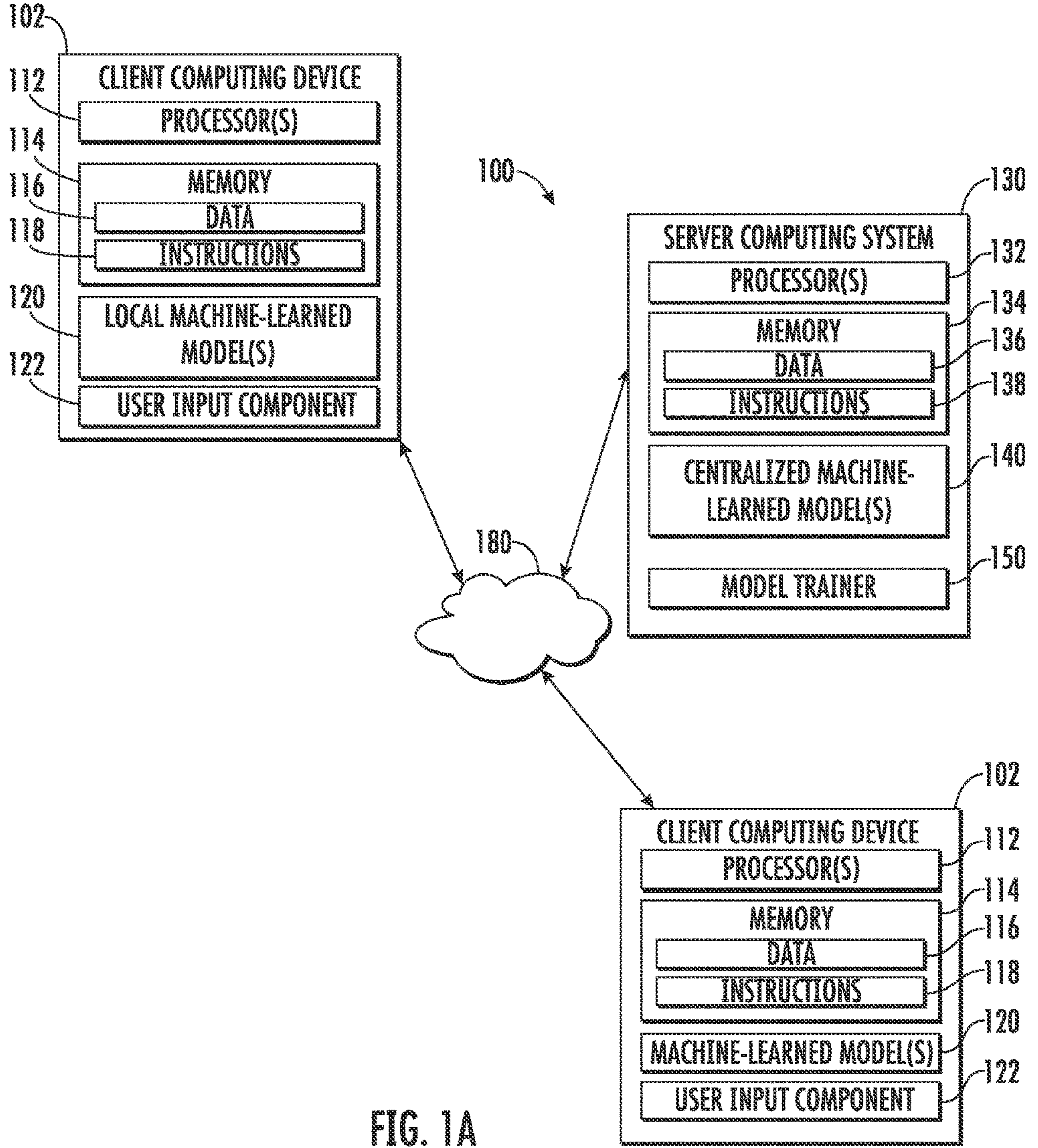
FIG. 1A depicts a block diagram of an example computing system according to example embodiments of the present disclosure.

Reference numerals that are repeated across plural figures are intended to identify the same features in various implementations.

DETAILED DESCRIPTION

Generally, the present disclosure is directed to distributed cache and/or replay systems for reinforcement learning. The proposed systems can improve the efficiency of model retrieval from a learner and/or reduce the time-to-convergence, such as in a massively large scale reinforcement learning setting. Furthermore, example aspects of the present disclosure can further increase the scalability of reinforcement learning systems. Example aspects of the present disclosure are directed to reinforcement learning for the purposes of illustration, but one of ordinary skill in the art will appreciate that the example aspects described herein can find applications in any suitable distributed systems in which there are distributed requests from one or more clients (e.g., thousands of clients) to a centralized server. The clients can regularly request updated variables (e.g., updated model parameters) from the server. For example, in a reinforcement learning setting, the learner is a server and actors are clients. For instance, in some implementations, after each iteration of training, the models on each of the clients can be updated.

For instance, a computing system can be configured for performing distributed large scale reinforcement learning with improved efficiency in accordance with example aspects of the present disclosure. The computing system can include a plurality of actor devices. Each actor device locally stores a local version of a machine-learned model, such as a decision model. For instance, each actor device can be configured to implement the local version of the machine-learned model at the actor device to determine an action to take in an environment to generate an experience. The actor device can interact with an environment and collect experience(s) (e.g., observations, actions, rewards, losses, etc.). To collect the experiences, the actor may use a policy model or decision model (e.g., identified by a model index) that is retrieved from and/or updated from a learner to navigate (e.g., by selecting and taking actions) in the environment. In some cases, the actor device does not need any synchronization signals from the learner during the experience collection process. For example, before each iteration of experience collection, each actor may retrieve the latest model(s) from the learner (e.g., a variable container) and perform one or more episodes of rollout in the environment. After collecting the experiences, the actor device may provide at least the experiences to a server computing system (e.g., a learner) to allow the learner to update the models. In some cases, the actor device can provide the experiences to the server computing system through replay memory, such as one or more replay buffers (e.g., sharded replay buffers).

For instance, in some implementations, the computing system can include a scoreboard. The scoreboard may be stored (e.g., partially) at actor devices and/or at a server computing system (e.g., a learner). The scoreboard can be or can include a number of steps taken in the environment for a given model version (e.g., a given model index). The scoreboard may be updated after each experience is provided, for example, The scoreboard can be used by the learner to determine whether or not a sufficient number of experiences exists (e.g., in a replay memory) before starting the training iteration. For example, the determination may be based on a criteria such as a fixed number of steps from the latest trained model available in memory.

The local version of the machine-learned model can be implemented at the actor device, such as at one or more processors included in the actor device and/or at other systems (e.g., control systems) at the actor device. For instance, implementing the local version of the model at the actor device can avoid increased overhead of data collection due to data communication from the actor device to an external computing device.

Additionally and/or alternatively, the computing system can be or can include a server computing system configured to perform one or more learning algorithms to learn an updated version of the machine-learned model based on the experiences generated by the plurality of actor devices. For instance, the actor devices can implement the local version of the machine-learned model at the actor device to determine an action to take in an environment to generate an experience, such as a loss, reward, etc., that may be provided to the server computing system (e.g., by a replay buffer) to be input to the learning algorithms.

For instance, in some implementations, the training can be performed with respect to one or more evaluators. An evaluator can evaluate performance of a trained model by performing one or more episodes of rollout. For instance, the evaluators can be included at the server computing system and/or separate computing devices in communication with the server computing system. In some cases, the evaluators do not need any synchronization signals from the server computing system to perform evaluations. The evaluators can communicate with the learner by retrieving the latest model.

The server computing system can perform training iterations in a distributed manner, such as on a tensor processing unit (TPU). For instance, such as once a sufficient number of collected experiences are available to the computing system (e.g., existing in a replay buffer), the learner can perform batching to produce batched experiences. The learner can feed the batched experiences to TPU cores and initiates the training process. Once the training is done, the model parameter and other related variables are updated. In some implementations, the training process may be performed transparently to actors and/or evaluators, avoiding a need for synchronization.

Additionally and/or alternatively, the computing system can include a hierarchical and distributed data caching system. The distributed data caching system can include a plurality of layers of data caches that propagate data descriptive of the updated version of the machine-learned model from the server computing system to the plurality of actor devices to enable each actor device to update its respective local version of the machine-learned model.

The plurality of layers of data caches can include at least a first layer that receives the data descriptive of the updated version of the machine-learned model from the server computing system and a final layer that provides the data descriptive of the updated version of the machine-learned model to the plurality of actor devices. Additionally and/or alternatively, the plurality of layers of data caches can further include one or more intermediate layers hierarchically positioned between the first layer and the final layer. In some implementations, each of the plurality of layers of data caches from the first layer to the final layer can include an increasing number of data caches. For instance, the first layer may include a single data cache. Additionally and/or alternatively, the final layer may include one or more caches for each actor device. In some implementations, for each of the plurality of layers of data caches except the final layer, each data cache can propagate the data descriptive of the updated version of the machine-learned model to two or more data caches in a next sequential layer.

In some implementations, each set (e.g., layer) of caches can be associated with a unique address. During initialization, the addresses for each layer of caches can be resolved by the lower level components. As one example, a server in a first layer can resolve the addresses for the data caches in a second layer. As another example, during initialization, the server computing system can resolve the addresses of the caches at the first layer.

In some implementations, communication between the server computing system and the distributed data caching system (e.g., the first layer) can follow a push architecture pattern. For instance, in some implementations, once new data (e.g., updated model parameters) is available on the server, such as after each training step, the server computing system can communicate data descriptive of the updated version of the machine-learned model to one or more data caches in the first layer. For instance, the data can be communicated using a push messaging mechanism. In some implementations, the server computing system and/or the data caches can communicate the data descriptive of the updated version of the machine-learned model using remote procedure calls, such as by initiating a series of remote procedure call (RPC) messages (e.g., multithreaded) to a subsequent layer of caches. One example RPC system is the gRPC protocol offered by Google LLC.

Additionally and/or alternatively, the architecture pattern for communication between (e.g., layers of) caches can be a push mechanism. For instance, in some implementations, during initialization, each cache in a layer is assigned a fixed set of data caches in a subsequent layer. This can be done using a resolver to resolve all the addresses for the subsequent layer of caches. For instance, one or more data caches included in the first layer can communicate the data descriptive of the updated version of the machine-learned model to one or more data caches in a subsequent layer using a push messaging mechanism. For example, the first layer can communicate the data after it is communicated from the server computing system. Additionally and/or alternatively, one or more data caches included in each of the one or more intermediate layers can communicate the data descriptive of the updated version of the machine-learned model to one or more data caches in a subsequent layer using a push messaging mechanism.

In some implementations, some or all data caches can include a versioned model history that includes historical versioning of the data descriptive of the machine-learned model. For example, in some implementations, the data descriptive of the updated version of the machine-learned model can include a current model version index. Each data cache may store only a most recent model version (e.g., indicated by the current model version index). Additionally and/or alternatively, each data cache may store one or more prior versions of the machine-learned model. For instance, the cache may have multiple spaces each associated with a model/version index. For example, the data cache may include a first-in, first-out cache of a plurality of model versions such that when a newer version of a model is received, the oldest stored version of that model is evicted from the cache. This can be beneficial in instances where the actors utilize older versions of a model (e.g., to compare updates) for any suitable application.

As one example, each set of data in a cache can be associated with a model version index indicating the freshness of the data (e.g. global step in training). Within each version can be a key and data structure such that each version includes a key and data. For instance, in some implementations, the key is a string identifier and the data is the serialized data. Each data cache may also hold a (e.g., limited) history of data. For example, in some implementations, both version k and version k+1 of a set of data are kept in a data cache.

In some implementations, the plurality of actor devices can obtain the data descriptive of the updated version of the machine-learned model from one or more data caches included in the final layer using a pull messaging mechanism. For instance, in some implementations, the architecture pattern between an actor device and a data cache (e.g., in a final layer) is a pull architecture pattern. For example, an actor device can initiate a request asking for updated model data to an address associated with one or more caches in a final layer. The request may be initiated periodically (e.g., on a timer), in response to some stimuli (e.g., performed automatically along with providing an experience), in response to a notification from the learner (e.g., which may be transmitted directly due to low associated latency), etc. The request can then be routed to an appropriate cache that can, in response, provide the most recent model data. In some cases, the most recent model data may be pulled only when an update is available, such as if a version index on the cache is more recent than a version index on the actor device.

In some implementations, the plurality of actor devices can be organized into a plurality of cells. For instance, one or more actor devices can be containerized (e.g., using a container architecture) in a single container. The container can provide a virtual operating environment (e.g., virtual addresses, resource allocations, etc.) that may differ from an actual operating environment and/or be more consistent than the actual operating environment. The respective actor devices in each cell can be managed as a single unit. For instance, for each of the plurality of cells, the final layer can include one or more cell-specific data caches that service only the respective actor devices in the cell.

For instance, one example implementation of the present disclosure includes a fixed number of (e.g., four) cell-specific data caches per cell. Additionally, a (e.g., single) cell in the first layer can be included in a same cell as the server computing system. For instance, the server computing system can act as a centralized learner and communicate with a plurality of actors in different cells (e.g., as opposed to being co-located in a cell with at least one actor). In some implementations, the cell-specific data caches can be connected directly to the data cache co-located on the same cell as the server and/or connected through a hierarchical network of intermediate layers. The data caches can be load balanced.

Additionally and/or alternatively, systems and methods according to example aspects of the present disclosure can include a computing for performing distributed large scale reinforcement learning with improved efficiency that includes a sharded replay memory for providing data from the actor devices to the server computing system. For instance, systems and methods according to example aspects of the present disclosure can support a sharded (e.g., distributed) replay memory (e.g., replay buffer). The sharded replay memory can significantly improve read and/or write throughput to and/or from the replay memory. For instance, the write throughput can be for the actors, as the actors can collect samples from the environment and write them into the replay buffer, which can require high throughput for a large number of actors. Additionally and/or alternatively, the read throughput can be beneficial for computing devices (e.g., processors) at the server computing system, such as compute engines (e.g., compute cores) at a processing unit, such as a TPU. For instance, in some implementations, each compute engine (e.g., core) may be associated with a single cell of actors, such as a single replay buffer of a plurality that collectively comprise the sharded replay memory.

As used herein, a sharded replay memory can be or can include a distributed (e.g., courier-based) buffer queue that includes a plurality of replay buffers that store collected experiences from some or all of the actors. The replay buffers can collectively comprise the sharded replay memory. For example, in some implementations, each replay buffer can store data associated with a single cell of actors. Additionally and/or alternatively, each replay buffer may provide data to one compute engine of a plurality of compute engines at a processing unit.

In some implementations, each experience (e.g., episode) in the replay memory can be marked by the model index to identify a timeline of the experiences. For instance, a learner can first update the model variables and/or update the model index, such as an incrementing variable controlled by the learner. The actors can then read the model index and/or model variables and insert the trajectories into the replay memory, such as with the model index to enforce on-policy behavior.

In some implementations, data (e.g., data provided to the caches and/or replay memory) can be represented using a variable container. For instance, some or all of the communications between actors, learner, and/or evaluators can be provided through courier-based variable containers. For instance, the variable container can be used to communicate the latest trained models (policy/value model) between learner, actors, and/or evaluators. The variable container(s) can be included at the actor devices and/or the server computing system. For instance, a variable container(s) at the server computing system can include model data such as model parameters, model version index, model values, model structure, and/or other suitable data.

For instance, these communication methods can provide for communication between different components (e.g., server, cache, and client). A request (e.g., a push request and/or a pull request) can include a list of versions that specifies the data history that is being requested. Additionally, a list of (e.g., regex) strings can be passed that specifies which cache keys are accessed. Additionally and/or alternatively, a request can include a timeout field that determines how long the message should be blocked before being terminated (e.g., in which case an empty message will be sent). This can be useful in cases with multiple caches with some data inconsistency (e.g., some caches may have fresher data than others). In these cases, the requester can resend the data that may be routed to another component that has the data. A reply message can include a serialized structure, such as a JSON structure., that includes the requested indices, keys, and their associated data. A hop field can be included that is useful for collecting statistics for the data cache service.

In some cases, the network latency may be unpredictable, which means that push requests may not always be successfully executed. If a cache misses updated data, subsequent caches will miss the updated data. For instance, if a first layer cache misses updated data, then a large number of caches may miss the updated data. One solution to this problem includes the pushing cache sending a periodic message to check the receive status of the child caches. If there are out-of-date child caches, the pushing cache can resend the updated data to it. Another solution includes setting exchanges between pushing and receiving caches in a fixed period of time. Furthermore, in some cases, a cache still has a chance to contain outdated data due to network partitioning. If a load balance algorithm uses a deterministic algorithm, the client may be connected to a fix server. This client will not receive the up-to-dated data in a desirable period of time Solutions to this problem include using a non-deterministic load balancing algorithm and/or having the clients read from more (e.g., redundant) caches.

In some implementations, the caches can include a backup system. For instance, the backup system can provide robustness for data in the cache. As one example, a restarted data cache job does nothing upon restart and, eventually, such as in the next round of updates by the server, the affected cache will be updated with fresh data. Meanwhile, the requests to the affected cache may not be served with the newest data. As another example, the computing system can include a backup mechanism in which a restarted cache requests the new data from other caches within the same level. For instance, a pull mechanism can be established within each level.

Example aspects of the present disclosure can provide a number of technical effects and benefits, including improvements to computing technologies, such as in systems including one or more servers (e.g., learners) and multiple clients (e.g., actors), such as on the order of thousands of clients (e.g., thousands of actors). Systems and methods according to example aspects of the present disclosure can include a hierarchical and distributed data caching system including a plurality of layers of data caches to distribute the updated variables. Including a distributed data caching system can provide for low-latency model updating. For instance, by including a plurality of layers of data caches facilitating multiple hops of caching, latency of updating the clients (e.g., thousands of clients) can be reduced, potentially at the cost of adding a few additional remote procedure call (e.g., gRPC) messages between the hops, which can be trivial compared to the latency savings from the hierarchical data caching system. As one example, the latency savings can be achieved by preventing throttling of the server computing system due to large volumes of data requests from multiple clients.

Furthermore, systems and methods according to example aspects of the present disclosure can include a sharded replay memory. Including a sharded replay memory can improve computing technology by preventing throttling of a server computing system. Additionally, the sharded replay memory can include a buffer for each compute engine in a processing unit, which can provide for improved computational distribution in the processing unit.

Furthermore, systems and methods according to example aspects of the present disclosure (e.g., including a data cache and/or sharded replay memory) can provide for a fully decoupled experience collection and training approach. This approach can provide larger scalability support and/or easier adaptation to off-policy and/or on-policy approaches with minimal changes. Furthermore, this can provide for an architecture that can be easily extended to a variety of reinforcement learning techniques and systems. For example, systems and methods according to example aspects of the present disclosure can be virtually unbounded in terms of number of actors and can be easily distributed to multiple cells.

With reference now to the Figures, example embodiments of the present disclosure will be discussed in further detail.

FIG. 1A depicts a block diagram of an example computing system 100 according to example embodiments of the present disclosure. The system 100 includes one or more client computing device(s) 102 (e.g., actors, such as computing devices running an actor service) and a server computing system 130 (e.g., a learner, such as a computing system running a learning service including one or more learning algorithms).

The client computing device(s) 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. For instance, the client computing device(s) 102 can be computing devices that are incorporated into and/or configured to operate a larger system, such as, for example, an autonomous vehicle, robotic system, mining system, aerial drone system, elevator system, web service system, fleet management system, data processing system, business management system, computing system resource management system, traffic management system, chemical reaction optimization system, personalized recommendation system, bidding system, advertising system, game-playing system (e.g., an AI opponent in a computerized game), deep learning tasks, and/or any other suitable system, or combination thereof.

The client computing device(s) 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the client computing device(s) 102 to perform operations.

In some implementations, the client computing device(s) 102 can store or include one or more machine-learned (e.g., decision) models 120. For example, the machine-learned (e.g., decision) models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned (e.g., decision) models 120 can be received from the server computing system 130 over network 180, stored in the client computing device(s) memory 114, and then used or otherwise implemented by the one or more processors 112. In some implementations, the client computing device(s) 102 can implement multiple parallel instances of a single machine-learned (e.g., decision) model 120. For instance, in some implementations, the machine-learned models 120 can be decision models that are implemented by an actor (e.g., an actor service at client computing device 102) to select an option from a plurality of options.

Additionally or alternatively, one or more machine-learned (e.g., decision) models 140 can be included in or otherwise stored and implemented by the server computing system 130 that communicates with the client computing device(s) 102 according to a client-server relationship. For example, the machine-learned (e.g., decision) models 140 can be implemented by the server computing system 140 as a portion of a web service. Thus, one or more models 120 can be stored and implemented at the client computing device(s) 102 and/or one or more models 140 can be stored and implemented at the server computing system 130.

The client computing device(s) 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned (e.g., decision) models 140, such as centralized instances of decision models for actors. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The server computing system 130 can include a model trainer 150 that trains the machine-learned models 120 and/or 140 stored at the client computing device(s) 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 150 can perform a number of generalization techniques (e.g., weight decays, dropouts, etc.) to improve the generalization capability of the models being trained.

In particular, the model trainer 150 can train the machine-learned (e.g., decision) models 120 and/or 140 based on a set of training data including training examples. In some implementations, if the user has provided consent, the training examples can be provided by the client computing device(s) 102. Thus, in such implementations, the model 120 provided to the client computing device(s) 102 can be trained by the training computing system 150 on user-specific data received from the client computing device(s) 102. In some instances, this process can be referred to as personalizing the model.

The model trainer 150 includes computer logic utilized to provide desired functionality. The model trainer 150 can be implemented in hardware, firmware, and/or software controlling a general purpose processor. For example, in some implementations, the model trainer 150 includes program files stored on a storage device, loaded into a memory and executed by one or more processors. In other implementations, the model trainer 150 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

Figure 1B:
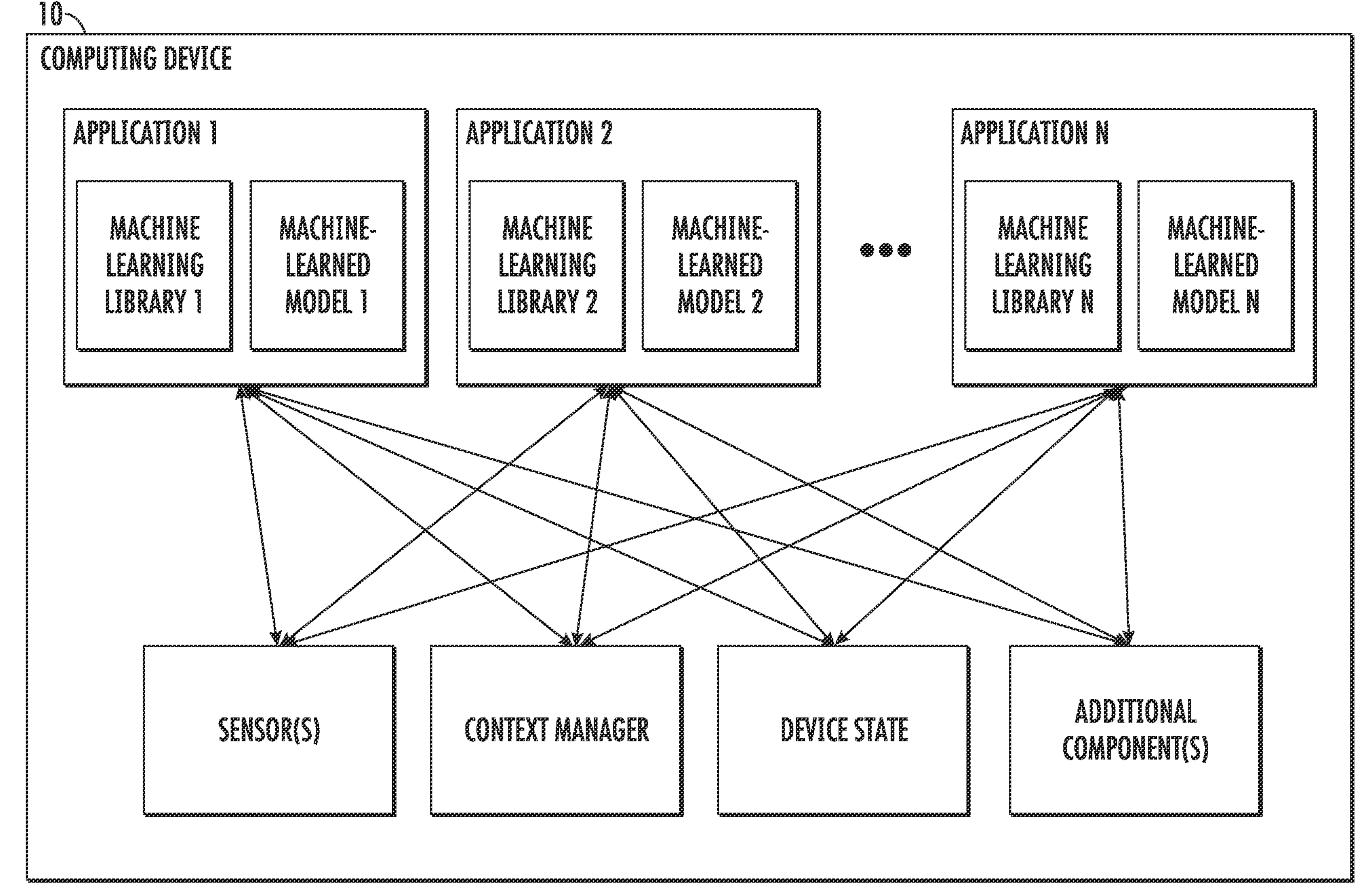
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a client computing device(s) or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
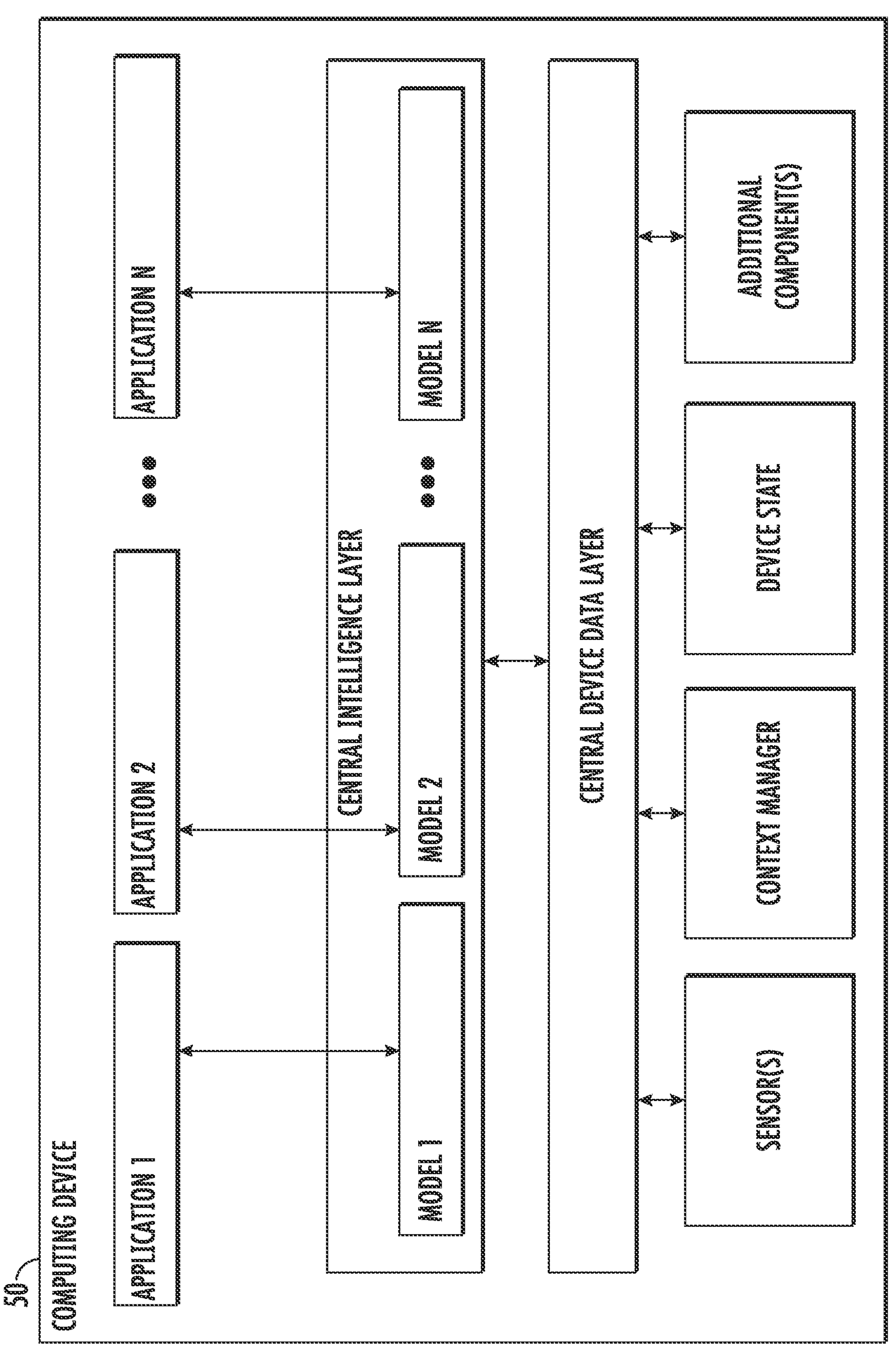
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a client computing device(s) or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figures 2, 3:
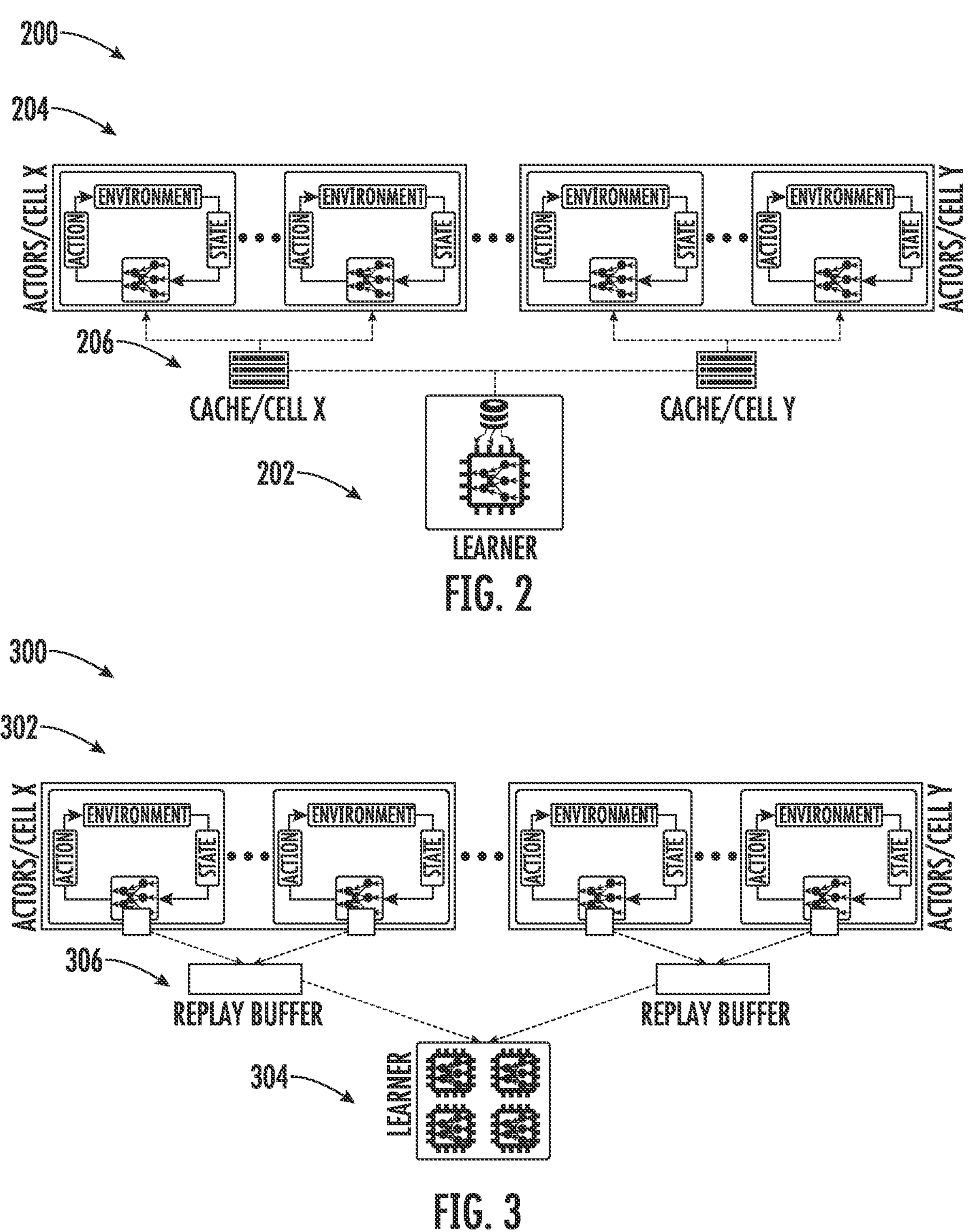
FIG. 2 depicts an example computing system for distributed reinforcement learning according to example embodiments of the present disclosure.
FIG. 3 depicts an example distributed reinforcement learning system for distributed reinforcement learning according to example embodiments of the present disclosure.

FIG. 2 depicts an example computing system 200 for distributed reinforcement learning according to example embodiments of the present disclosure. Computing system 200 includes a centralized learner (e.g., a server computing system) 202 and a plurality of actors 204. Additionally, computing system 200 includes a distributed cache system 206. For example, computing system 200 can include multiple actors 204 placed in different cells. The dashed lines represent communication, such as gRPC communication, between different machines (e.g., different cells). Servicing the frequent model update requests from a massive number of actors 204 across different cells can throttle the learner 202 and the communication network between learner 202 and actors 204 if all requests are sent directly to the learner 202, which can lead to a significant increase in the overall convergence time. Thus, computing system 200 can include distributed cache system 206. The learner 202 sends the updated model to the distributed cache system 206. Each caching service handles the model request updates from the nearby actors, such as actors placed on the same cells as the caching service. The cache 206 not only reduces the load on the learner 202 for servicing the model update requests but also reduces the average read latency by the actors 204. For instance, The cache 206 can balance a potentially massive number of requests from actors 204 between the actors 204 and the learner 202. Thus, the cache 206 can reduce pressure on the learner 202 to service the read requests from the actors 204 and/or further facilitate distribution of the actors 204 across multiple cells with only a marginal added communication overhead.

FIG. 3 depicts an example computing system 300 for distributed reinforcement learning according to example embodiments of the present disclosure. Computing system 300 includes a centralized learner (e.g., a server computing system) 304 and a plurality of actors 302. The plurality of actors 302 can provide experiences to the learner 304. For instance, to avoid throttling the learner 304, the actors 302 may provide the experiences first to replay memory 306, such as a replay buffer. In some cases, Servicing a massive number of write requests from the actors 302 can throttle the replay memory 306, which reduces its overall throughput. In addition, if the learner 304 includes multiple compute engines (e.g., cores), feeding the data to these engines from a single replay buffer service can be inefficient, which negatively impacts the overall convergence time. Thus, as illustrated in FIG. 3, the replay memory 306 can be a sharded replay memory 306 (e.g., a sharded replay buffer), which can increase the throughput between actors, learner, and replay buffer services. In the sharded replay memory 306, each replay buffer service acts as a dedicated data storage for a collection of actors 302, such as a collection of actors 302 each located on the same cell. The use of sharded replay memory 306 can yield a higher input pipeline throughput, such as throughput to an accelerator's compute engines in the learner 304.

Figure 4:
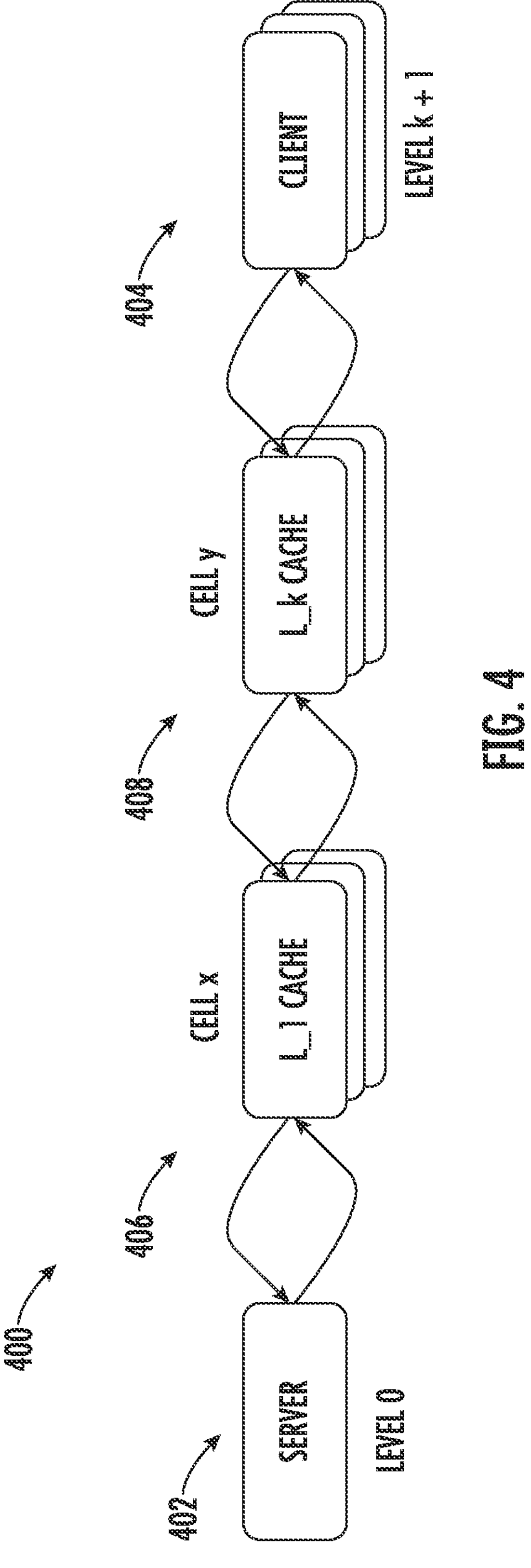
FIG. 4 depicts an example computing system for distributed reinforcement learning according to example embodiments of the present disclosure.

FIG. 4 depicts an example computing system 400 for distributed reinforcement learning according to example embodiments of the present disclosure. For instance, computing system 400 includes server computing system 402 and multiple client devices 404. The client devices 404 can (e.g., regularly) request updated variables from the server computing system 402. For example, in a reinforcement learning setting, the server computing system 402 can be a learner (e.g., including one or more learning algorithms) and the client devices 404 can be actors. The computing system 400 can include a distributed caching system that includes a first layer 406 and a final (e.g., $k^{th}$) layer 408. For instance, as depicted in FIG. 4, the layers 406, 408 can each be disposed in a separate cell. The first layer 406 can receive updated model data from the server computing system 402 (e.g., by a push message). The first layer 406 can then push the updated data to the final layer 408. Although not depicted in FIG. 4, in some implementations, one or more intermediate layers can be disposed between first layer 406 and final layer 408. The final layer 408 can provide the data to the client devices 404 (e.g., in response to a pull message).

Figure 5:
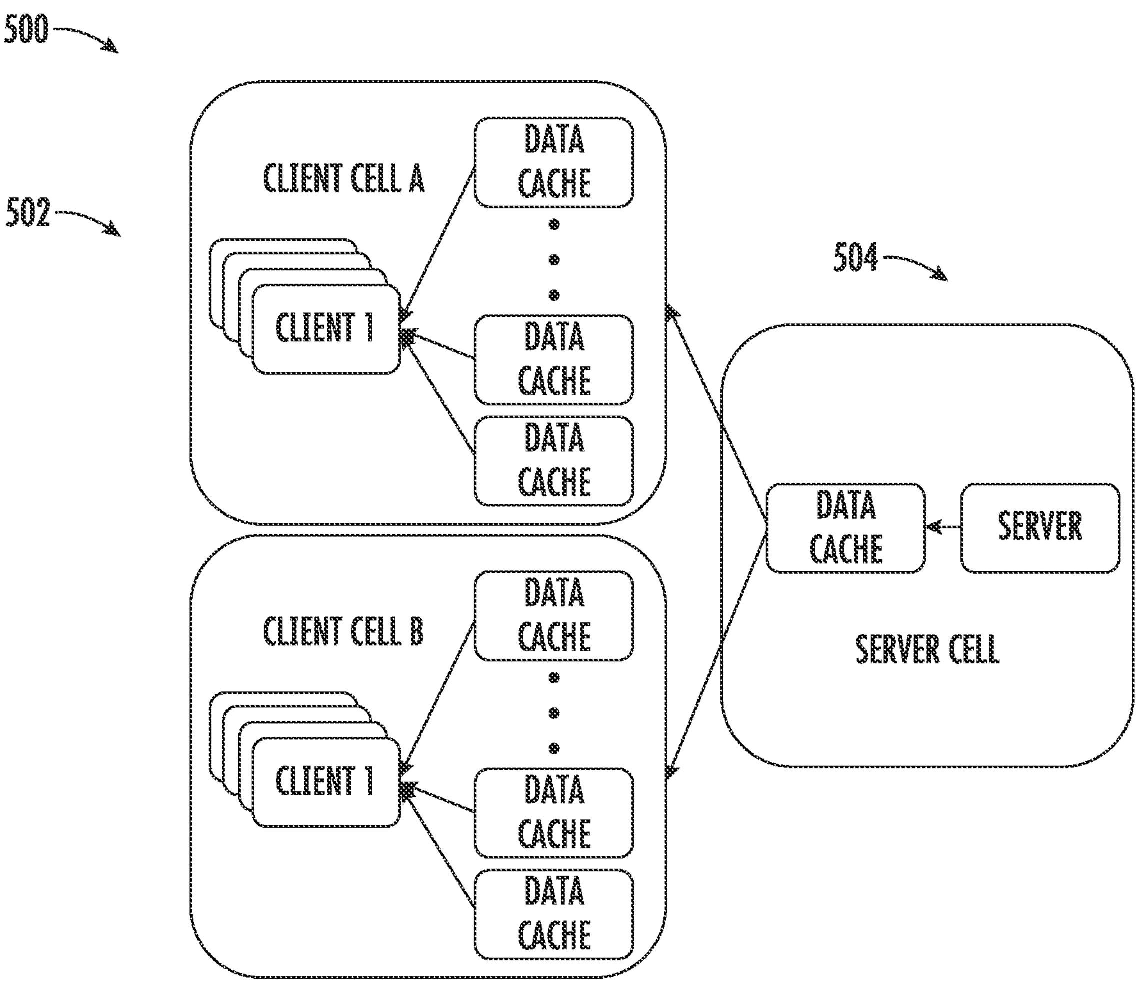
FIG. 5 depicts an example computing system for distributed reinforcement learning according to example embodiments of the present disclosure.

FIG. 5 depicts an example computing system 500 for distributed reinforcement learning according to example embodiments of the present disclosure. Computing system 500 includes a plurality of client devices that are organized into a plurality of client cells 502. For instance, one or more client devices can be containerized (e.g., using a container architecture) in a single container forming the client cell 502. The container can provide a virtual operating environment (e.g., virtual addresses, resource allocations, etc.) that may differ from an actual operating environment and/or be more consistent than the actual operating environment. The respective client devices in each client cell 502 can be managed as a single unit. For instance, for each of the plurality of cells, the final layer can include one or more cell-specific data caches that service only the respective actor devices in the client cell 502.

For instance, the computing system 500 includes a fixed number of (e.g., four) cell-specific data caches per client cell 502. Additionally, a (e.g., single) cell in the first layer can be included in a server cell 504 in addition to the server computing system. For instance, the server computing system can act as a centralized learner and communicate with a plurality of actors in different cells 502 (e.g., as opposed to being co-located in a cell with at least one actor). In some implementations, the cell-specific data caches can be connected directly to the data cache co-located on the same cell as the server and/or connected through a hierarchical network of intermediate layers (not illustrated). The data caches can be load balanced.

Figure 6:
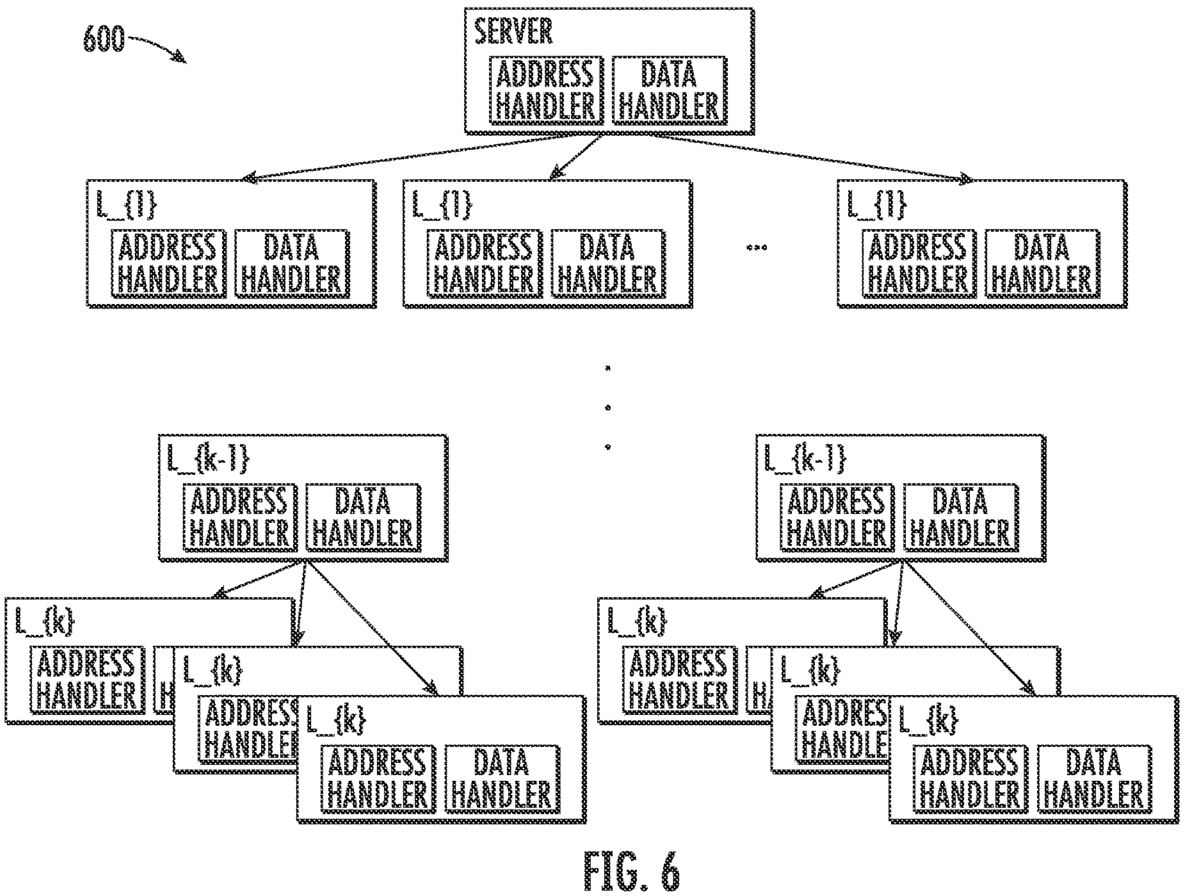
FIG. 6 depicts an example computing system for distributed reinforcement learning according to example embodiments of the present disclosure.

FIG. 6 depicts an example computing system 600 for distributed reinforcement learning according to example embodiments of the present disclosure. For instance, the computing system 600 can include a distributed cache system. Some or all caches in an $i^{th}$ layer (e.g., server, first, and/or intermediate layer) can include an address handler and/or a data handler. For instance, the data handler can create multiple channels that connect to an associated child cache in a subsequent layer. The address handler can fetch the addresses of its child caches periodically and/or only in initialization. The data handler may be configured to check the status of its child caches and/or send updated data (e.g., via push message) if a particular cache is behind (e.g., as indicated by a model index) and/or periodically. Additionally and/or alternatively, the data handler may receive updated data from a parent cache in a subsequent layer. Additionally and/or alternatively, the data handler may return the latest version of the data.

Figure 7:
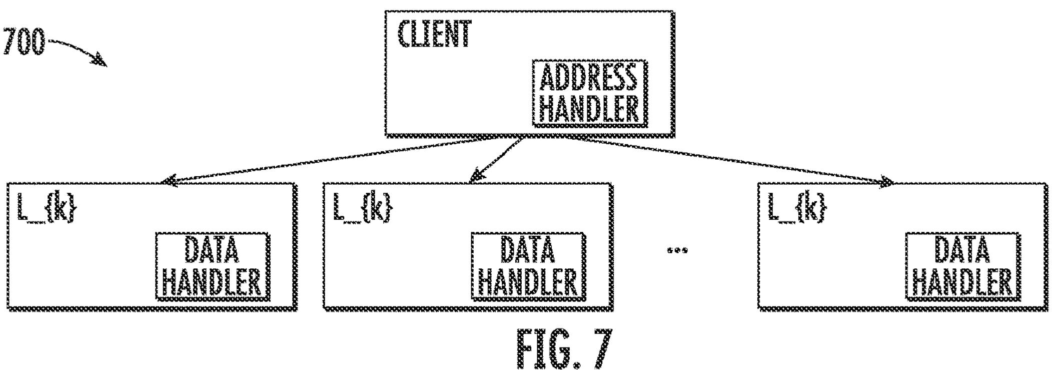
FIG. 7 depicts an example computing system for distributed reinforcement learning according to example embodiments of the present disclosure.

FIG. 7 depicts an example computing system 700 for distributed reinforcement learning according to example embodiments of the present disclosure. A client device may include an address handler to fetch addresses of caches in the final layer that service the client device. The client device can send a pull request to one or more of the caches servicing the client device to request updated data (e.g., periodically, and/or in response to stimuli). The cache can provide the updated data (e.g., subsequent to verifying that the cache is in possession of updated data, such as by a version index comparison).

For example, an actor device can initiate a request asking for updated model data to an address associated with one or more caches in a final layer. The request may be initiated periodically (e.g., on a timer), in response to some stimuli (e.g., performed automatically along with providing an experience), in response to a notification from the learner (e.g., which may be transmitted directly due to low associated latency), etc. The request can then be routed to an appropriate cache that can, in response, provide the most recent model data. In some cases, the most recent model data may be pulled only when an update is available, such as if a version index on the cache is more recent than a version index on the actor device.

Figure 8:
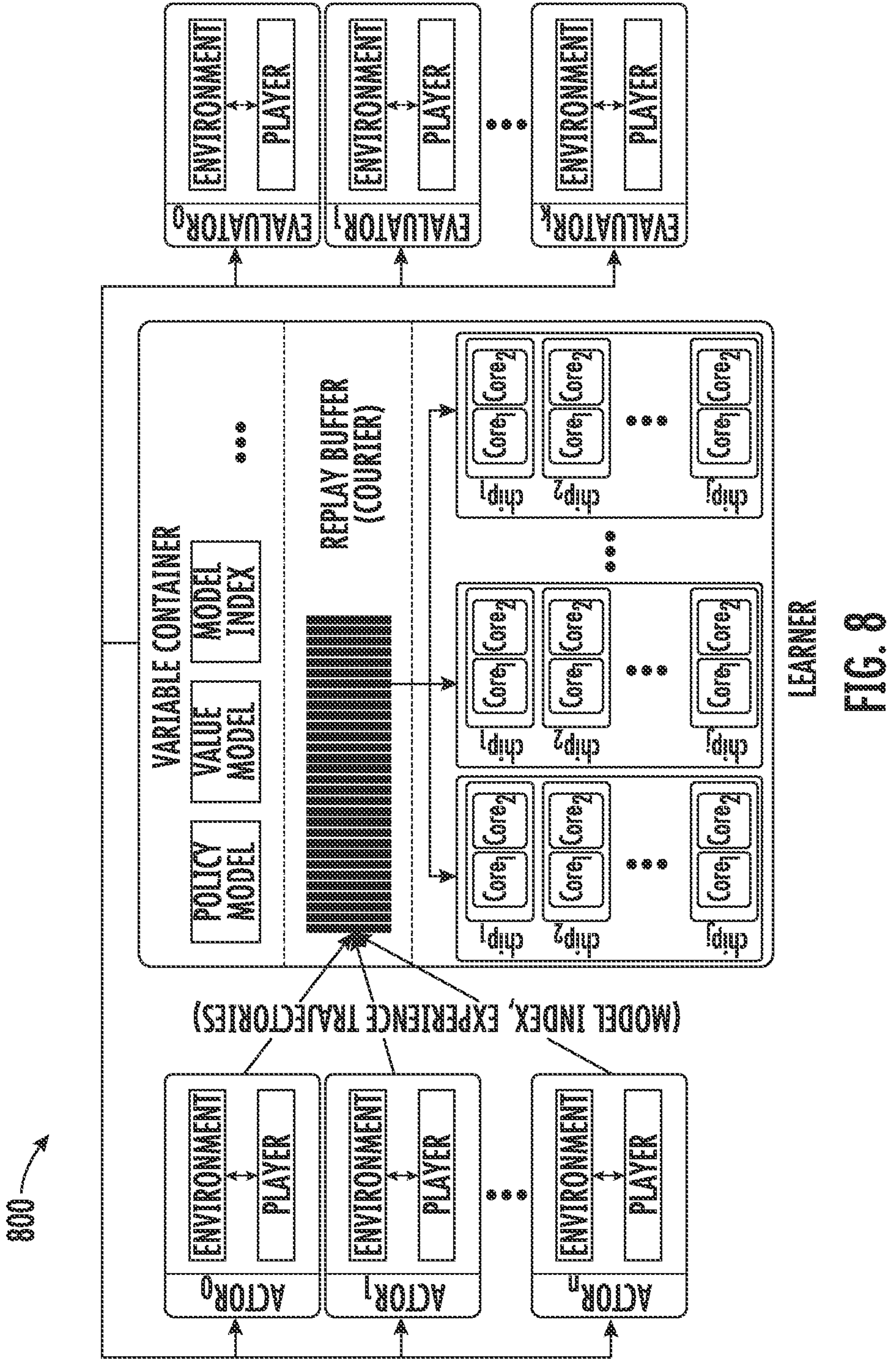
FIG. 8 depicts an example computing system for distributed reinforcement learning according to example embodiments of the present disclosure.

FIG. 8 depicts an example computing system 800 for distributed reinforcement learning according to example embodiments of the present disclosure. For instance, computing system 800 can include a plurality of actors. The actors can include a player (e.g., a decision model) that interacts with an environment. The actors can provide model index and/or experience trajectories to a replay buffer (e.g., a sharded replay buffer). The experience trajectories can be processed by compute units (e.g., compute cores) and used to determine an updated machine-learned model. The updated model data, along with a model index, can be stored in a variable container. The variable container can be distributed to the actors and/or to evaluators to continually train the model.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for performing distributed large scale reinforcement learning with improved efficiency, the computing system comprising:

a plurality of actor devices, wherein each actor device locally stores a local version of a machine-learned model, and wherein each actor device is configured to implement the local version of the machine-learned model at the actor device to determine an action to take in an environment to generate an experience;

a server computing system configured to perform one or more learning algorithms to learn an updated version of the machine-learned model based on the experiences generated by the plurality of actor devices; and a hierarchical and distributed data caching system comprising a plurality of layers of data caches that propagate data descriptive of the updated version of the machine-learned model from the server computing system to the plurality of actor devices to enable each actor device to update its respective local version of the machine-learned model, wherein the plurality of layers of data caches comprise at least a first layer that receives the data descriptive of the updated version of the machine-learned model from the server computing system and a final layer that provides the data descriptive of the updated version of the machine-learned model to the plurality of actor devices.

2. The computing system of claim 1, wherein the plurality of layers of data caches further comprise one or more intermediate layers hierarchically positioned between the first layer and the final layer.

3. The computing system of claim 2, wherein one or more data caches included in each of the one or more intermediate layers communicate the data descriptive of the updated version of the machine-learned model to one or more data caches in a subsequent layer using a push messaging mechanism.

4. The computing system of claim 1, wherein each of the plurality of layers of data caches from the first layer to the final layer comprises an increasing number of data caches.

5. The computing system of claim 1, wherein the first layer comprises a single data cache.

6. The computing system of claim 1, wherein, for each of the plurality of layers of data caches except the final layer, each data cache propagates the data descriptive of the updated version of the machine-learned model to two or more data caches in a next sequential layer.

7. The computing system of claim 1, wherein:

the plurality of actor devices are organized into a plurality of cells;

the respective actor devices in each cell are managed as a single unit; and for each of the plurality of cells, the final layer comprises one or more cell-specific data caches that service only the respective actor devices in the cell.

8. The computing system of claim 1, wherein the server computing system is organized into a server cell, and wherein the first layer is organized into the server cell.

9. The computing system of claim 1, wherein one or more data caches included in the first layer communicate the data descriptive of the updated version of the machine-learned model to one or more data caches in a subsequent layer using a push messaging mechanism.

10. The computing system of claim 1, wherein the plurality of actor devices obtain the data descriptive of the updated version of the machine- learned model from one or more data caches included in the final layer using a pull messaging mechanism.

11. The computing system of claim 1, wherein the data caches communicate the data descriptive of the updated version of the machine-learned model using remote procedure calls.

12. The computing system of claim 1, wherein the data descriptive of the updated version of the machine-learned model comprises a current model version index.

13. The computing system of claim 12, wherein the data caches communicate data descriptive of the updated version of the machine-learned model to an actor device of the plurality of actor devices only if the data descriptive of the updated version of the machine-learned model comprises a new model version index than a model version index at the actor device.

14. The computing system of claim 1, wherein the data caches comprise a backup system.

15. The computing system of claim 1, wherein the plurality of actor devices are configured to periodically request updated data from the data caching system.

16. The computing system of claim 1, wherein the plurality of actor devices are configured to request updated data from the data caching system in response to a notification from the server computing system.

17. The computing system of claim 1, wherein the data caches comprise a key and value data structure.

18. A computing system for performing distributed large scale reinforcement learning with improved efficiency, the computing system comprising:

a plurality of actor devices, wherein each actor device locally stores a local version of a machine-learned model, and wherein each actor device is configured to implement the local version of the machine-learned model at the actor device to determine an action to take in an environment to generate an experience;

a server computing system configured to perform one or more learning algorithms to learn an updated version of the machine-learned model based on the experiences generated by the plurality of actor devices; and a distributed replay memory including a plurality of replay buffers, a first replay buffer of the plurality of replay buffers configured to store first experiences generated by a first plurality of actor devices, a second replay buffer of the plurality of replay buffers configured to store second experiences generated by a second plurality of actor devices, wherein the plurality of replay buffers provide the first and second experiences to the server computing system for use in learning the updated version of the machine-learned model, the server computing system comprising:

a first compute engine configured to receive the first experiences cached by the first replay buffer; and a second compute engine configured to receive the second experiences cached by the second replay buffer.

19. The computing system of claim 18, wherein the first replay buffer is connected to the first compute engine and the second replay buffer is connected to the second compute engine.

20. The computing system of claim 18, wherein the plurality of compute engines comprise a plurality of compute cores in a processing unit.

21. The computing system of claim 18, wherein the processing unit comprises a tensor processing unit.

22. A computing system for performing distributed large scale reinforcement learning with improved efficiency, the computing system comprising:

a server computing system configured to perform one or more learning algorithms to learn an updated version of a machine-learned model based on a plurality of experiences generated by a plurality of actor devices, wherein each actor device locally stores a local version of the machine-learned model, and wherein each actor device is configured to implement the local version of the machine-learned model at the actor device to determine an action to take in an environment to generate one of the plurality of experiences; and a hierarchical and distributed data caching system comprising a plurality of layers of data caches that propagate data descriptive of the updated version of the machine-learned model from the server computing system to the plurality of actor devices to enable each actor device to update its respective local version of the machine-learned model, wherein the plurality of layers of data caches comprise at least a first layer that receives the data descriptive of the updated version of the machine-learned model from the server computing system and a final layer that provides the data descriptive of the updated version of the machine-learned model to the plurality of actor devices.

23. A computing system for performing distributed large scale reinforcement learning with improved efficiency, the computing system comprising:

a server computing system configured to perform one or more learning algorithms to learn an updated version of a machine-learned model based on a plurality of experiences generated by the plurality of actor devices, wherein each actor device locally stores a local version of the machine-learned model, and wherein each actor device is configured to implement the local version of the machine-learned model at the actor device to determine an action to take in an environment to generate one of the plurality of experiences; and a distributed replay memory including a plurality of replay buffers, a first replay buffer of the plurality of replay buffers configured to store first experiences generated by a first plurality of actor devices, a second replay buffer of the plurality of replay buffers configured to store second experiences generated by a second plurality of actor devices, wherein the plurality of replay buffers provide the first and second experiences to the server computing system for use in learning the updated version of the machine-learned model, the server computing system comprising:

a first compute engine configured to receive the first experiences cached by the first replay buffer; and a second compute engine configured to receive the second experiences cached by the second replay buffer.

* * * * *